US005698003A

United States Patent [19]

Omilinsky et al.

[11] Patent Number: 5,698,003
[45] Date of Patent: Dec. 16, 1997

[54] FORMULATION FOR FERTILIZER ADDITIVE CONCENTRATE

[75] Inventors: Barry A. Omilinsky, Princeton Junction; Alexander D. Lindsay, East Brunswick, both of N.J.; Allen R. Sutton, Corydon; Willis L. Thornsberry, Jr., Sturgis, both of Ky.

[73] Assignee: IMC-Agrico Company, Northbrook, Ill.

[21] Appl. No.: 575,025

[22] Filed: Dec. 19, 1995

[51] Int. Cl.$^6$ .................................................. C05C 9/00
[52] U.S. Cl. .......................... 71/28; 71/64.1; 71/902; 564/12; 564/15
[58] Field of Search .................... 71/28, 902, 64.1; 428/334; 564/12, 15

[56] References Cited

U.S. PATENT DOCUMENTS

| | | | |
|---|---|---|---|
| H25 | 2/1986 | Radel | 71/6 |
| 3,462,256 | 8/1969 | Justice | 71/28 |
| 3,576,613 | 4/1971 | Fleming | 71/28 |
| 4,089,899 | 5/1978 | Greidinger et al. | 260/553 R |
| 4,240,923 | 12/1980 | Sartori et al. | 252/189 |
| 4,518,413 | 5/1985 | Swerdloff et al. | 71/28 |
| 4,530,714 | 7/1985 | Kolc et al. | 71/28 |
| 4,676,822 | 6/1987 | Gautney | 71/29 |
| 5,071,463 | 12/1991 | Narayanan et al. | 71/79 |
| 5,160,528 | 11/1992 | Chaudhuri et al. | 71/79 |
| 5,188,654 | 2/1993 | Manalastas et al. | 71/28 |
| 5,256,181 | 10/1993 | Manalastas et al. | 71/28 |
| 5,352,265 | 10/1994 | Weston et al. | 71/29 |
| 5,364,438 | 11/1994 | Weston et al. | 71/29 |

FOREIGN PATENT DOCUMENTS

| | | |
|---|---|---|
| 55-10626 | 2/1980 | Japan. |

*Primary Examiner*—Ferris Lander
*Attorney, Agent, or Firm*—Fisher, Christen & Sabol

[57] ABSTRACT

Improved solvent systems for the formulation of N-alkyl thiophosphoric triamide urease inhibitors. These formulations enable the preparation of stable concentrated solutions of N-alkyl thiophosphoric triamides for storage, transportation, and eventual impregnation onto solid urea containing fertilizers and incorporation into liquid urea containing fertilizer compositions. These formulations are comprised primarily of a solvent selected from the group consisting of glycols and glycol derivatives. Optionally, in addition to the glycol base solvent, the formulations can contain a co-solvent selected from the group consisting of liquid amides, 2-pyrrolidone and N-alkyl 2-pyrrolidones, and/or a nonionic surfactant selected from the group consisting of alkylaryl polyether alcohols. The presence of the co-solvent and/or surfactant has been found to impart desirable properties to the formulations under certain conditions. N-alkyl thiophosphoric triamides have been known for some time to be effective inhibitors of the activity of urease enzymes, however, commercial use has been inhibited by the lack of an acceptable carrier. They are often thermally and hydrolytically unstable and difficult to handle. The use of the solvent systems offers many advantages including: (1) improved stability of the active ingredient urease inhibitor; (2) excellent solubility characteristics; (3) extremely low flammability and toxicity of the solvents; (4) excellent cold temperature storage and handling characteristics with the addition of the liquid amide co-solvent; and (5) good adsorption characteristics onto solid urea containing fertilizers and excellent miscibility with liquid urea containing fertilizer formulations.

26 Claims, No Drawings a fertilizer additive concentrate. More specifically, the invention involves the composition of a solution of a phosphoramide in a solvent which is a glycol or glycol derivative with or without the presence of nonionic surfactants which are alkylaryl polyether alcohols, or mixed solvents of such glycol or glycol derivative with a liquid amide. Again, the mixed solvent can contain nonionic surfactants which are alkylaryl polyether alcohols. N-alkyl thiophosphoric triamides inhibit the activity of the urease enzyme. The urease enzyme catalyzes the decomposition of urea-based fertilizers to ammonia and the ammonium ion. As a result of inhibiting this activity, the performance of the urea-based fertilizers is improved. The improved composition of the invention increases the nitrogen uptake efficiency of plants, enhances crop yields, and minimizes the loss of fertilizer-derived nitrogen. The N-alkyl thiophosphoric triamide is impregnated onto a granular fertilizer formulation by blending the concentrated solution of N-alkyl thiophosphoric triamide in a solvent selected from the group consisting of a glycol or glycol derivative or a mixed solvent comprising a glycol or glycol derivative and a liquid amide. These solutions can include such alkylaryl polyether alcohols as nonionic surfactants. Alternatively, the above mentioned solutions of the urease inhibitor can be mixed with liquid fertilizer compositions containing urea-based fertilizers.

FORMULATION FOR FERTILIZER ADDITIVE CONCENTRATE

FIELD OF THE INVENTION

The invention relates to an improved formulation for

BACKGROUND OF THE INVENTION

Nitrogen is an important plant nutrient. In addition to phosphorus, potassium, and other nutrients, nitrogen is needed to support the growth and development of plant life. Some plants, such as legumes, through a symbiotic relationship with Rhizobium bacteria take up elemental nitrogen from the atmosphere and fix this nitrogen into the soil. However, most plants grown to produce human and animal food require the use of nitrogen fertilizer in order to sustain their agricultural production.

The most widely used and agriculturally important high-analysis nitrogen fertilizer is urea, $CO(NH_2)_2$. About 60 million tons per year of urea are produced world-wide and used on a variety of crops, such as, corn, wheat and rice. When applied to moist soil, the urea becomes a source of ammonia as a result of hydrolysis catalyzed by urease, an enzyme produced by numerous fungi and bacteria. The reaction may be written as follows:

$$CO(NH_2)_2 + H_2O \xrightarrow{Urease} 2NH_3 + CO_2$$

The major problems associated with the use of urea as a source of these nitrogen nutrients to support the growth of crop plants relate to the rapid catalytic hydrolysis of urea to ammonia and carbon dioxide. The premature conversion of urea into ammonia contributes to the low efficiency (as low as 40 percent under some conditions) with which crop plants utilize urea-based fertilizer nitrogen. The worse conditions for nitrogen losses to ammonia volatilization are the application of urea-based fertilizer to moist soil followed by a number of days of drying conditions. This scenario allows for the conversion of the urea to ammonia on the surface of the soil without subsequent rainfall that would facilitate the conversion to ammonium and adsorption by the soil. Examples of mechanisms by which nitrogen can be lost from the soil include loss of ammonia through volatilization to the atmosphere and loss of nitrate through leaching to the subsoil by rainwater and/or through denitrification, i.e., bacterial conversion of nitrate to elemental nitrogen. Another drawback related to rapid hydrolysis of urea is the potential for excessive accumulation of ammonia in the soil shortly after seeding which may damage germinating seedlings and young plants.

The prior art offers three approaches to make nutrient nitrogen derived from urea-containing granular fertilizers available to root systems of plants throughout their growing season: (1) multiple fertilizer applications; (2) synthetically produced, controlled release fertilizers; and (3) the incorporation of urease inhibitors or nitrification inhibitors into the fertilizer formulation. There are certain limitations and disadvantages associated with each of these approaches advocated by the prior art.

The first approach involves the use of multiple fertilizer applications during the course of a crop growth season. Such multiple fertilizer applications can provide adequate nitrogen to meet the demand of growing plants, but they do so at the expense of higher fertilizer costs, higher fertilizer application costs, and the adverse environmental impact associated with the loss of nitrogen through nitrate leaching to the subsoil and ammonia volatilization.

The second approach to extending the availability of nutrient nitrogen to crop plants over a longer period of time involves the use of controlled release granular fertilizers. In general terms there are two types of fertilizers in this category, namely, coated and noncoated fertilizers. The patent literature provides numerous references to prior art methodology for the production of coated controlled release fertilizers. The oldest of these is the use of molten sulfur to produce sulfur-coated nitrogen fertilizer pellets having a controlled fertilizer dissolution rate. The process comprises applying a coating of sulfur to fertilizer pellets and subsequently top-coating the resultant particles with an oily sealant to impregnate any cracks and voids in such sulfur coating. As a result, a sulfur shell is formed which is nearly impervious to water and suitable for regulating the dissolution rate of the nitrogen fertilizer, and thereby extending its availability to the plants. Numerous other patents describe methods to improve the efficiency of the sulfur coating process. Other coated fertilizer technology comprises the use of polymers to provide the coating for the fertilizer particles. These products have many advantages because the release of nitrogen through the coating is controlled by diffusion through the semi-permeable membrane. Therefore, the rate of nitrogen release can be controlled by the composition and thickness of the polymer coating. A new technology known as Reactive Layer Coating (RLC) is based upon the deposition of polymeric diphenylmethane diisocyanate onto the fertilizer particles followed by the deposition of a second coating of polyethyleneterphthalate. These two coatings react in situ to form a polyurethane. All of these coated fertilizer technologies have the disadvantage of relatively high production costs and their application has been limited to speciality markets, such as, high cost fruit and vegetables or nursery and ornamental plant applications. The high cost of these products has been a detriment to their use for general agriculture applications. The non-coated fertilizers that have been or are being used as controlled release fertilizers comprise synthetically altered urea fertilizers. The oldest of these technologies are urea-formaldehyde reaction products and methylene ureas or methylene diurea/dimethylene triurea (MDU/DMTU) compositions. These various polymer compositions define the degree of urea/formaldehyde polymerization which in turn is used to control the nitrogen availability from these compositions. Generally the longer the methylene urea polymer length, the longer it takes to fully become available as a plant nutrient. Again, these products are primarily limited to turf and garden, commercial nurseries and speciality agriculture markets.

The third approach toward improving the availability of nitrogen to the root system of plants over an extended period of time entails the incorporation of a urease inhibitor into liquid or granular urea-containing fertilizers. Urease inhibitors are compounds capable of inhibiting the catalytic activity of the urease enzyme upon urea in moist soil. Among the most effective urease inhibitors are the phosphoric triamide compounds disclosed in U.S. Pat. No. 4,530,714. An example of an effective urease inhibitor disclosed in the U.S. Pat. No. '714 patent is N-(n-butyl)thiophosphoric triamide, which will be referred to herein as NBPT. When incorporated into a urea-containing fertilizer, NBPT reduces the rate at which urea is hydrolyzed in the soil to ammonia. The benefits realized as a result of the delayed urea hydrolysis include the following: (1) nutrient nitrogen is available to the plant over a longer period of time; (2) excessive build up of ammonia in the soil following the application of the urea-containing fertilizer is avoided; (3) the potential for nitrogen loss through ammonia volatilization is reduced; (4) the potential for damage by high levels of ammonia to seedlings and young plants is reduced; (5) plant uptake of nitrogen is increased; and (6) an increase in crop yields is attained. The liquid compositions of the U.S. Pat. No. '714 patent can contain complex ether alcohols as dispersing or emulsifying agents.

NBPT has not been commercially used heretofore as an additive in liquid or granular urea. A major reason for this is the lack of a suitable method for the preparation of such NBPT-containing urea-based fertilizers which stems from certain physical and chemical characteristics of industrial grade NBPT which render this material difficult to handle. Industrial grade NBPT is a waxy, sticky, heat-sensitive and water-sensitive material. Consequently, the material is susceptible to decomposition during storage and distribution. The use of a liquid formulation of the NBPT is highly desirable because it greatly facilitates the introduction of the NBPT onto granular urea and into liquid fertilizers containing urea. The impregnation of NBPT onto urea requires the NBPT to be introduced into some liquid carrier prior to being sprayed onto the urea. Because of the aforementioned characteristics of commercial NBPT this has proven to be a time-consuming and difficult procedure which has heretofore mitigated against the commercialization of NBPT. The introduction of NBPT into liquid urea-containing fertilizers, such as, urea-ammonium nitrate solutions (UAN), would also be facilited by having the NBPT in an easily assimilated liquid formulation.

BROAD DESCRIPTION OF THE INVENTION

An object of the invention is to provide a formulation for N-alkyl thiophosphoric triamides that will readily allow for their impregnation onto urea-containing solid fertilizer and allow for their easy incorporation into liquid fertilizer formulations containing urea. This formulation facilitates the application of N-alkyl thiophosphoric triamides which, in turn, eliminates the use of high amounts of urea-containing nitrogen fertilizer that are currently used to assure that crop yields are not limited by the availability of nitrogen as a plant nutrient or the use of higher cost controlled release fertilizers for more efficient application of urea-based nitrogen fertilizers. Another object of the invention is to provide a formulation that will allow for the introduction of N-alkyl thiophosphoric triamides into urea-based liquid fertilizers or for the impregnation of solid urea fertilizer, the performance of which is characterized by low ammonia volatilization losses. A further object of the invention is to provide methods of impregnating urea-containing solid fertilizer with the invention formulations or incorporating the invention formulations into liquid fertilizer formulations containing urea.

The objectives and advantages of the invention are achieved by the formulations and methods of the invention.

The invention involves an improved homogeneous formulation comprising N-alkyl thiophosphoric triamide and a glycol or glycol derivative. The glycol or glycol derivative is a solvent for the N-alkyl thiophosphoric triamides. Optionally, the invention formulation can also contain an additional solvent belonging to the group consisting of liquid amides, 2-pyrrolidone and N-alkyl 2-pyrrolidones. Also the invention formulation can optionally contain other additives, such as, a dye, a nonionic surfactant selected from the group consisting of alkylaryl polyether alcohols, and/or micronutrients. As defined herein, the alkylaryl polyether alcohols are those where the alkyl groups have from 6 to 16 carbon atoms and the average number of ethylene oxide units in the side chain are from 6 to 30 moles. The preferred nonionic surfactants are the octylphenol polyether alcohols.

The invention method also involves applying the homogenous concentrated formulation of the invention to a solid urea-containing fertilizer composition or incorporating the homogeneous concentrated formulation of the invention into a liquid urea-containing fertilizer composition.

DETAILED DESCRIPTION OF THE INVENTION

As used herein, all percentages are on a weight basis unless otherwise stated herein or otherwise obvious herefrom to one skilled in the art.

The invention provides an improved formulation for the group of N-alkyl thiophosphoric triamide urease inhibitors described in U.S. Pat. No. 4,530,714. The pertinent portions of U.S. Pat. No. 4,530,714 are incorporated herein by reference. The invention formulation is comprised of at least one N-alkyl thiophosphoric triamide and at least one glycol and/or glycol derivative. Optionally, the formulation can also contain at least one additional solvent belonging to the group consisting of liquid amides, 2-pyrrolidone, and N-alkyl 2-pyrrolidones. Also the formulation can optionally contain other additives, such as, at least one dye, at least one nonionic surfactant selected from the group consisting of alkylaryl polyether alcohols, or at least one micronutrient. The use of the invention formulations offer a number of advantages such as: (1) improved stability of the active ingredient urease inhibitor; (2) excellent solubility characteristics; (3) extremely low flammability and toxicity of the solvents which greatly simplifies the handling and storage of the concentrate; (4) excellent cold temperature storage characteristics with the addition of the liquid amide co-solvent; and (5) good adsorption characteristics onto the solid urea containing fertilizers and excellent miscibility with liquid urea containing fertilizer formulations.

It should be understood that the term N-alkyl thiophosphoric triamide as used throughout this application refers not only to the N-alkyl thiophosphoric triamide in its pure form, but also to commercial grades of the material which can contain up to 50 percent (or less), preferably not more than 20 percent, of impurities, depending on the method of synthesis and purification scheme(s), if any, employed in the production.

The preferred glycols or diols can be preferably represented by the general formula $C_nH_{2n}(OH)_2$, where n is 2 or more (preferably n is 2 to 6). The term glycols is applied, in general, to aliphatic dihydroxy (dihydric) alcohols. Examples of the preferred glycols (diols) are ethylene glycol (glycol), propylene glycol (1,2-propanediol), 1,4-butanediol, 1,5-pentanediol, 1,6-hexanediol, 1,10-decanediol, 1,7-heptanediol, 1,9-nonanediol, 1,8-octanediol, 1,3-propanediol, 1,3-butanediol, 1,4-butanediol, 2,3-butanediol, 2,4-pentanediol, 2,5-hexanediol, 4,5-octanediol and 3,4-hexanediol. Examples of other noncyclic glycols (diols) are neopenty glycol, pinacol, 2,2-diethyl-1,3-propanediol, 2-ethyl-1,3-hexanediol, 2-ethyl-2-butyl-1,3-propanediol, isobutylene glycol, 2,3-dimethyl-1,3-propanediol, 1,3-diphenyl-1,3-propanediol, 3-methyl-1,3-butanediol. Examples of cyclic glycols are 1,4-cyclohexanedimethanol and p-xylylene glycol. Examples of polyglycols are polyethylene glycols and polypropylene glycols.

Examples of glycol (diol) derivatives which are esters are ethylene glycol monostearate, ethylene glycol distearate, ethylene glycol amido stearate, propylene glycol monostearate, propylene glycol dicaprylate, propylene glycol dicaprate diacetate glycol, dilaurate glycol, dipalmite glycol, diformate glycol, dibutyrate glycol, dibenzorate glycol, dipalmate glycol, dipropionate glycol, monoacetate glycol, monopalmitate glycol and monoformate glycol. Diethylene glycol monostearate is also an ester derivative.

Examples of polyglycol (polydiol) derivatives which are esters are polyethylene glycol (PEG) 200–6000 mono and dilaurates, such as, PEG 600 dilaurate, PEG 600 monolaurate, PEG 1000 dilaurate, PEG 1000 monolaurate, PEG 1540 dilaurate and PEG 1540 monolaurate, polyethylene glycol 200–6000 mono and dioleates, such as, PEG 400 monoleate, PEG 600 dioleate, PEG 600 monooleate, PEG 1000 monoleate, PEG 1540 dioleate, PEG 1540 monooleate and polyethylene glycol 200–6000 mono and distearates, such as, PEG 400 distearate, PEG 400 monostearate, PEG 600 distearate, PEG 600 monostearate, PEG 1000 distearate, PEG 1000 monostearate, PEG 1540 distearate, PEG 1540 monostearate and PEG 3000 monostearate.

Glycerol (glycerine) is a triol glycerol. Examples of glycerol esters are glycerol monostearate, glycerol distearate, glycerol monooleate, glycerol monolaurate, glycerol dilaurate, glycerol dipalmitate, glycerol monopalmitate, glycerol triacetate, glycerol tribenzoate, glycerol tributyrate, glycerol trimyristate, glycerol trioleate, glycerol trilaurate, glycerol tripalmitate and glycerol tristearate.

The glycol or glycol derivative content of the composition of this invention is between about 99 percent by weight and about 50 percent by weight, and preferably between about 70 percent by weight and about 80 percent by weight, when present as the sole component of the formulation other than the N-alkyl thiophosphoric triamide urease inhibitor. The N-alkyl thiophosphoric triamide content of the composition is between about 1.0 percent by weight and about 50 percent weight, and preferably between about 20 percent by weight and about 30 percent by weight. Optionally, in addition to the glycol or glycol derivative, the formulation can contain a co-solvent chosen from the group consisting of liquid amides, 2-pyrrolidone and N-alkyl 2-pyrrolidones. The optional mixed solvent formulation can contain one of the "liquid amides" in a concentration of between about 0.5 percent by weight and about 30 percent by weight, and preferably between about 5 percent by weight and about 20 percent by weight, together with the N-alkyl thiophosphoric triamide in the same concentration ranges described for the concentrate with the glycol or glycol derivative as the sole solvent. The balance of the mixed solvent would then consist of one of the solvents selected from the group of glycols and glycol derivatives. In other words, the mixed content of the composition of the invention is between about 99 percent by weight and about 50 percent by weight, and preferably between about 70 percent by weight and about 80 percent by weight, based upon the only other component of the formulation being the N-alkyl thiophosphoric triamide urease inhibitor. Moreover, the N-alkyl thiophosphoric triamide concentration formulation can also optionally contain other additives, such as, a dye(s), a nonionic surfactant(s) selected from the group consisting of alkylaryl polyether alcohols, and a micronutrient(s). When the nonionic surfactant is optionally included in either the mixed solvent formulation or with the liquid glycol formulation, the concentration range will be between about 1.0 percent by weight and about 20 percent by weight, based upon the total weight of the composition, with a preferred concentration range between about 8 percent by weight and about 15 percent by weight, based upon the total weight of the composition.

As already stated, industrial grade N-alkyl thiophosphoric triamides are often waxy and sticky materials, and as such are difficult to handle in conventional industrial equipment. Furthermore, N-alkyl thiophosphoric triamides are poorly soluble in water, in aqueous solutions, such as ammonium hydroxide solutions, and in numerous organic solvents, such as, toluene, benzene, hexane, dichloromethane, and others. The lower alcohols are good solvents for the N-alkyl thiophosphoric triamides, but they are flammable and present safety problems. Also the N-alkyl thiophosphoric triamides have proven to be unstable in many aqueous and non-aqueous solvents.

It has now been discovered, however, that N-alkyl thiophosphoric triamides exhibit exceptional solubility and stability in solvents selected from the group of glycols and glycol derivatives. Moreover, it has been discovered that the addition of certain liquid amides having the formula $R_1CONR_2R_3$, wherein $R_1$ is a hydrogen atom or an alkyl group having up to 4 carbon atoms and wherein $R_2$ and $R_3$ are independently hydrogen atoms, alkyl (preferably $C_1$–$C_6$) groups or phenyl groups, 2-pyrrolidone, and N-alkyl 2-pyrrolidones wherein the alkyl group ranges in size from one to twelve carbon atoms, to the formulation improve the cold temperature flowability of the formulation with no significant loss in the stability of the formulation. Finally, it has been discovered that the addition of certain nonionic surfactants selected from the group consisting of alkylaryl polyether alcohols to the formulation(s) can impart certain desirable characteristics such as enhanced stability to the formulation(s). These solutions can be stored over extended periods of time and can conveniently serve as a vehicle to impregnate the N-alkyl thiophosphoric triamide onto urea based solid fertilizers using a variety of fertilizer bulk blending equipment commonly available with fertilizer dealers and distributors. Any suitable or conventional equipment can be used to apply the formulation to the solid fertilizer. Preferably the addition provides a thorough impregnation of the solid fertilizers by the formulation. The fact that these above mentioned formulations are universally miscible with the typical liquid urea containing fertilizers also makes these formulations extremely useful for these applications. Any suitable or conventional equipment can be used to incorporate the formulation into the liquid fertilizer.

Examples of liquid amides used in the practice of this invention include formamide, N,N-dimethyl formamide, N,N-dimethyl acetamide and N-butyl N-phenyl acetamide. The N-alkyl 2-pyrrolidones used in accordance with this invention are five-membered heterocyclic organic compounds with one nitrogen atom per ring, with an oxygen atom bonded to a ring carbon atom adjacent to the nitrogen, and with an alkyl group ranging in size from one to twelve carbon atoms bonded directly to the nitrogen atom. Examples of N-alkyl 2-pyrrolidones which can be used as NBPT solvents in practicing this invention include N-methyl 2-pyrrolidone, N-octyl 2-pyrrolidone, and N-dodecyl 2-pyrrolidone. The preferred "liquid amide" solvent used in the practice of this invention is N-methyl 2-pyrrolidone.

N-alkyl thiophosphoric triamide solutions in solvents of this invention remain stable over extended periods of time and over temperatures ranging from about 30° F. to about 120° F. Thus, the concentrated solutions of this invention can be managed using conventional liquid storage, transportation, and pumping equipment. The amount of concentrated N-alkyl thiophosphoric triamide solution added to either solid or liquid urea-based fertilizer compositions in accordance with this invention depends on the desired N-alkyl thiophosphoric triamide content of the fertilizer composition and on the N-alkyl thiophosphoric triamide content of the concentrated solution. This can be readily calculated by those skilled in the art.

U.S. Pat. Nos. 5,352,265 and 5,364,438 teach the use of N-methyl pyrrolidone (NMP) as a carrier for NBPT. NMP is an excellent solvent for NBPT. However, solutions for the preparation of "stand-alone" formulations which require long term stability and lower costs are better served by the solvents used in the present invention. The invention solvents consisting of (i) glycols and (ii) glycols with a co-solvent comprised of a "liquid amide" as defined in this specification have proven to be superior. The solvents used by the invention are also superior to the delivery systems of U.S. Pat. Nos. 5,071,463 and 5,160,528.

The prior art use of NMP as the sole solvent for incorporation of NBPT into urea during production of the urea has useful features because of the greater solubility of NBPT in NMP results in the incorporation of less solvent into the urea and has much less adverse effect upon the physical properties of the urea granules. If the need for long term stability is not great, then prior art NMP solutions which will be used soon after preparation are sufficient.

A primary distinction between the current invention and the known patents related to coated fertilizer products are the cost of the coated fertilizers. Such prior art coated fertilizers are speciality products that are only used in very limited applications because of their high cost. The use of the urease inhibitors with urea are considerably cheaper and are designed for general crop applications. It is believed that the reference to fertilizers containing urease inhibitors in such patents are for urease inhibitor containing fertilizers that are additionally polymer coated. The application of the various polymer coatings and the solvents used for these applications are totally different from the impregnation of urea with urease inhibitors. Furthermore, the current invention provides ease of application and enhanced economics as opposed to the prior art coated fertilizers.

There are a number of patents that teach the use of various chemicals as urease inhibitors, however, their delivery systems have one or several disadvantages such as flammability, cost, stability problems. The lower alcohols are good solvents but their use was rejected as a result of safety issues.

EXAMPLE 1

This example describes the preparation of concentrated solutions nominally containing 25 percent by weight of active ingredient N-(n-butyl) thiophosphoric triamide (NBPT) in a series of solvents and solvent systems from the group of chemicals previously disclosed in the above description of the invention. NBPT is a representative of the class of N-alkyl thiophosphoric triamide urease inhibitors and is the most developed representative of this class of chemicals for commercial applications. This example illustrates not only the high solubility of NBPT in the solvents of this invention, but also the long term stability of concentrated NBPT solutions in these solvents. The N-(n-butyl) thiophosphoric triamide used in this test was industrial grade NBPT which contained about 89 percent of active ingredient and had the waxy and sticky appearance previously described for these materials. Nevertheless, the dissolution proceeded easily in all cases. The long term stability results at three different temperatures for each of the solvents or solvent systems are shown in Table I below. The solvent or solvent systems used in this example are described as follows:

Solvent or Solvent System

A. Propylene glycol.

B. Propylene glycol and 20 percent by weight of NP-100 (one of the class of octylphenol polyether alcohol nonionic surfactants previously disclosed in the description of the invention). NP-100 is marketed by Witco and is poly(oxy-1,2-ethanediyl)-alpha (nonylphenyl)omega-hydroxy.

C. Propylene glycol, 20 percent by weight of N-methyl pyrrolidone (NMP) (one of the class of liquid amides previously disclosed in the description of the invention), and 20 percent by weight of NP-100.

D. Dipropylene glycol and 10 percent by weight of NP-100.

The glycols (represented by propylene glycol or dipropylene glycol) provide the balance of the composition of the formulation in each case.

TABLE I

Stability of NBPT in Various Solvents

| Time (Mo.) | Solvent Temp. (°C.) | A | | | B | | | C | | | D | | |
|---|---|---|---|---|---|---|---|---|---|---|---|---|---|
| | | 25° | 37° | 50° | 25° | 37° | 50° | 25° | 37° | 50° | 25° | 37° | 50° |
| Initial | | 24.7 | 24.7 | 24.7 | 25.4 | 25.4 | 25.4 | 25.1 | 25.1 | 25.1 | 24.7 | 24.7 | 24.7 |
| 1 | | 25.2 | 25.1 | 24.4 | 25.5 | 25.0 | 24.6 | 25.2 | 24.7 | 23.7 | 25.2 | 24.9 | 23.0 |
| 2 | | 24.9 | 24.5 | 23.5 | 24.7 | 24.4 | 23.6 | 24.8 | 23.7 | 22.4 | 24.6 | 24.0 | 21.7 |
| 3 | | 23.7 | 23.8 | — | 23.2 | 24.0 | 24.6 | 22.2 | 24.2 | 24.3 | 21.1 | 24.2 | 24.0 |
| 4 | | 25.2 | 24.8 | — | 25.2 | 24.2 | — | 25.1 | 23.8 | — | 24.7 | 23.8 | — |
| 5 | | 24.6 | 24.2 | — | 24.2 | 23.2 | — | 24.9 | 23.0 | — | 25.1 | 22.8 | — |
| 6 | | 24.2 | 23.8 | — | 23.8 | 23.9 | — | 23.6 | 22.7 | — | 23.6 | 22.5 | — |
| 7 | | 24.9 | 24.3 | — | 24.5 | — | — | 24.6 | 23.0 | — | 24.6 | 22.9 | — |
| 8 | | 25.3 | 24.1 | — | 25.1 | — | — | 25.0 | 23.2 | — | 24.6 | 22.5 | — |
| 9 | | 24.5 | 23.9 | — | 23.9 | — | — | 24.6 | 23.1 | — | 24.3 | 22.2 | — |

EXAMPLE 2

This example illustrates the method of this invention for the incorporation of NBPT onto a homogenous urea-based granular fertilizer composition. As a first step, a solution of 25 percent of active ingredient NBPT was prepared by dissolving the industrial grade NBPT into propylene glycol. This concentrated NBPT solution was pumped onto granular urea in commercial blending equipment at a fertilizer dealers plant. A dye (0.1 percent of FD&C green dye #3) was included in the formulation to provide a means to observe the distribution of the NBPT concentrate on the urea. Visual observation of the impregnated urea indicated that the NBPT was uniformly distributed onto each granule of the product over a period of about 2 to 3 minutes contact in the blender. This observation was substantiated by the assay of three grab samples from the blended urea which showed analyses of 990, 1000, and 1030 ppm.

EXAMPLE 3

This example describes the improvement in the pourability of propylene glycol formulations of NBPT at the level of 25 percent active ingredient resulting from the introduction of N-methyl pyrollidone (NMP), (a representative of the class of compounds referred to in the description of the invention as "liquid amides"). The various formulations were placed in four ounce bottles, seeded with NBPT and placed in a cold box at temperatures between 0° and 3° C. The following observations were made: The solutions containing 0 percent, 2.5 percent, and 5.0 percent of NMP in addition to the propylene glycol and NBPT required temperatures greater than 15° C. to be pourable. Solutions containing 7.5 percent NMP had a pour point of greater than 10° C. while the presence of 10.0 percent of NMP lowered the pour point to 0° C.

List Of Abbreviations

RLC Reactive Layer Coating
MDU methylene diurea
DMTU dimethylene triurea
NBPT N-(n-butyl)thiophosphoric triamide
UAN urea-ammonium nitrate
NMP N-methyl pyrrolidone

What is claimed is:

1. A composition of matter comprising a concentrated solution of at least one N-alkyl thiophosphoric triamide in at least one solvent selected from the group consisting of glycols and glycol derivatives, said solvent providing stability enhancement for said at least one N-alkyl thiophosphoric triamide.

2. The composition of matter claimed in claim 1 which also contains a nonionic surfactant selected from the group consisting of alkylaryl polyether alcohols.

3. The composition of matter as claimed in claim 2 wherein the content of said N-alkyl thiophosphoric triamide in said solution is between about 1.0 percent by weight and about 50.0 percent by weight.

4. The composition of matter as claimed in claim 2 wherein the alkyl group in the N-alkyl thiophosphoric triamide is an n-butyl group.

5. The composition of matter as claimed in claim 2 wherein the content of the nonionic surfactant selected from the group consisting of alkylaryl polyether alcohols in said solution is present in a concentration range between about 1 percent by weight and about 20 percent by weight.

6. The composition of matter as claimed in claim 2 wherein the content of the nonionic surfactant selected from the group consisting of alkylaryl polyether alcohols in said solution is present in a concentration range between about 8 percent by weight and about 15 percent by weight.

7. The composition of matter as claimed in claim 1 wherein the content of said N-alkyl thiophosphoric triamide in said solution is between 1.0 percent by weight and about 50.0 percent by weight.

8. The composition of matter as claimed in claim 1 wherein the alkyl group in the N-alkyl thiophosphoric triamide is an n-butyl group.

9. A method comprising mixing a N-alkyl thiophosphoric triamide, which is in the form of a composition of matter as claimed in claim 1, with a liquid fertilizer composition containing a urea-based fertilizer.

10. A method comprising storing the composition of matter as claimed in claim 1, whereby the stability of said at least one N-alkyl thiophosphoric triamide is enhanced by said solvent.

11. A composition of matter comprising a concentrated solution of an N-alkyl thiophosphoric triamide in a solvent mixture of a first solvent selected from the group consisting of glycols and glycol derivatives, and a second solvent selected from the group consisting of liquid amides having the formula $R_1CONR_2R_3$, wherein $R_1$ is a hydrogen atom or an alkyl group having up to 4 carbon atoms and wherein $R_2$ and $R_3$ are independently hydrogen atoms, alkyl groups, or phenyl groups, 2-pyrrolidone, and N-alkyl 2-pyrrolidones, wherein the alkyl group has from one to twelve carbon atoms, said first solvent providing stability enhancement for said at least one N-alkyl thiophosphoric triamide.

12. The composition of matter as claimed in claim 11 which also contains a nonionic surfactant selected from the group consisting of alkylaryl polyether alcohols.

13. The composition of matter as claimed in claim 12 wherein the content of said N-alkyl thiophosphoric triamide in said solution is between about 1.0 percent by weight and about 50.0 percent by weight.

14. The composition of matter as claimed in claim 12 wherein the alkyl group in the N-alkyl thiophosphoric triamide is an n-butyl group.

15. The composition of matter as claimed in claim 12 wherein the content of the liquid amide in said solution is between about 0.5 percent by weight and about 30 percent by weight with the balance of the solution being selected from the group consisting of glycols and glycol derivatives, and nonionic surfactants selected from the group consisting of alkylaryl polyether alcohols.

16. The composition of matter as claimed in claim 15 wherein the content of the nonionic surfactant selected from the group consisting of alkylaryl polyether alcohols in said solution is present in a concentration range between about 1 percent by weight and about 20 percent by weight.

17. The composition of matter as claimed in claim 15 wherein the content of the nonionic surfactant selected from the group consisting of alkylaryl polyether alcohols in said solution is present in a concentration range between about 8 percent by weight and about 15 percent by weight.

18. The composition of matter as claimed in claim 12 wherein the content of the liquid amide in said solution is between about 5 percent by weight and about 20 percent by weight with the balance of the solution being selected from the group consisting of glycols and glycol derivatives, and nonionic surfactants selected from the group consisting of alkylaryl polyether alcohols.

19. The composition of matter as claimed in claim 18 wherein the content of the nonionic surfactant selected from the group consisting of alkylaryl polyether alcohols in said solution is present in a concentration range between about 1 percent by weight and about 20 percent by weight.

20. The composition of matter as claimed in claim 18 wherein the content of the nonionic surfactant selected from the group consisting of alkylaryl polyether alcohols in said solution is present in a concentration range between about 8 percent by weight and about 15 percent by weight.

21. The composition of matter as claimed in claim 11 wherein the content of said N-alkyl thiophosphoric triamide in said solution is between about 1.0 percent by weight and about 50.0 percent by weight.

22. The composition of matter as claimed in claim 11 wherein the alkyl group in the N-alkyl thiophosphoric triamide is an n-butyl group.

23. The composition of matter as claimed in claim 11 wherein the content of the liquid amide in said solution is between about 0.5 percent by weight and about 30 percent by weight with the balance of the solution being selected from the group consisting of glycols and glycol derivatives.

24. The composition of matter as claimed in claim 11 wherein content of the liquid amide in said solution is between about 5 percent by weight and about 20 percent by weight with the balance of the solution being selected from the group consisting of glycols and glycol derivatives.

25. A method comprising mixing a N-alkyl thiophosphoric triamide, which is in the form of a composition of matter as claimed in claim 11, with a liquid fertilizer composition containing a urea-based fertilizer.

26. A method comprising storing the composition of matter as claimed in claim 11, whereby the stability of said at least one N-alkyl thiophosphoric triamide is enhanced by said first solvent.

* * * * *